United States Patent
Carpenter et al.

(10) Patent No.: US 6,178,472 B1
(45) Date of Patent: Jan. 23, 2001

(54) QUEUE HAVING DISTRIBUTED MULTIPLEXING LOGIC

(75) Inventors: Gary Dale Carpenter, Pflugerville; David Brian Glasco, Austin; Richard Nicholas Iachetta, Jr., Pflugerville, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/097,331

(22) Filed: Jun. 15, 1998

(51) Int. Cl.$^7$ ............................... G06F 13/12; G11C 7/00
(52) U.S. Cl. ..................... 710/54; 365/189.05; 365/221
(58) Field of Search ........................ 710/51, 54, 20, 710/29, 55; 712/28; 365/189.05, 221

(56) References Cited

U.S. PATENT DOCUMENTS

| | | | |
|---|---|---|---|
| 4,833,655 | * 5/1989 | Wolf et al. | 365/221 |
| 4,979,190 | * 12/1990 | Sager et al. | 375/106 |
| 5,774,475 | * 6/1998 | Qureshi | 371/22.31 |
| 5,844,844 | * 12/1998 | Bauer et al. | 365/189.05 |

\* cited by examiner

*Primary Examiner*—Thomas C. Lee
*Assistant Examiner*—Albert Wang
(74) *Attorney, Agent, or Firm*—Casimer K. Salys; Felsman, Bradley, Vaden, Gunter & Dillon, LLP

(57) ABSTRACT

A queue includes a data multiplexer having an output and at least two inputs and a plurality of data latches. The data latches include at least a first data latch and a second data latch, which each have a data input and a data output. The data output of the first data latch is coupled to a first input of the data multiplexer, and the output of the data multiplexer is coupled to the data input of the second data latch. A data value to be stored in the queue is received at a second input to the data multiplexer. In response to one or more control signals, the data value is latched into at least one of the first and second data latches, thereby storing the data value in the queue. Depending upon the design of the control logic, the queue can implement either first in, first out (FIFO) or last in, first out (LIFO) behavior.

21 Claims, 3 Drawing Sheets

QUEUE HAVING DISTRIBUTED MULTIPLEXING LOGIC

BACKGROUND OF THE INVENTION

1. Technical Field

The present invention relates in general to digital circuitry and, in particular, to a queue within a digital circuit. Still more particularly, the present invention relates to an improved queue design having distributed multiplexing logic.

2. Description of the Related Art

As illustrated in FIG. 1, one conventional realization of a first in, first out (FIFO) queue 10 within a field programmable gate array (FPGA) includes two or more entry latches 12, one for each entry in FIFO queue 10. Each entry latch 12 is implemented with a D-latch having an n-bit data input (D), an enable input (E), a clock input (CLK), and an n-bit data output (Q). To form FIFO queue 10, entry latches 12 are cascaded, with the output of each entry latch 12 except the one forming the bottom entry being connected to the data input of the latch forming the subsequent entry and the data input of the latch forming the top entry receiving the n-bit Data_in value. The data output (Q) of each of entry latches 12 is also connected to a respective input of multiplexer 14, which selects as an output value the n-bit input value specified by the select signal generated by mux control 16 in response to global Read and Write control signals. The n-bit output of multiplexer 14 is in turn connected to the data input of an output latch 18, which latches in input values and latches out an n-bit data_out value in response to the clock input (CLK).

During operation, when mux control 16 senses that the Read control signal is asserted, mux control 16 generates a select signal that specifies the mux input corresponding to the oldest occupied entry in FIFO queue 10. During the clock cycle in which the Read control signal is asserted, the input value present at the selected mux input is passed to output latch 18, which latches in the input value. Then, during the next clock cycle, output latch 18 outputs the n-bit Data_out value.

Conversely, when the Write control signal is asserted, the Data_in value is latched into the entry latch 12 forming the top entry in FIFO queue 10. Because the Write control signal is connected to the enable inputs of all entry latches 12, each other entry latch 12 latches the value held by the preceding entry latch 12 during a write. The value, if any, held by the entry latch 12 forming the bottom entry in the queue is latched out and discarded (unless the Read control signal is also asserted).

The present invention includes a recognition that the conventional FIFO queue design for FPGAs depicted in FIG. 1 suffers from a number of deficiencies. For example, the operation of output latch 18 introduces a cycle of latency in the output data path, as discussed above. In addition, as queue depth increases, multiplexer 14 becomes large and operates more slowly, which introduces additional latency in the output data path. Furthermore, the delay associated with the interconnect connecting entry latches 12 and multiplexer 14 can introduce significant latency in the operation of FIFO queue 10. It would therefore be desirable to provide an improved queue design for that addresses these and other deficiencies of the conventional FIFO queue design shown in FIG. 1.

SUMMARY OF THE INVENTION

It is therefore one object of the present invention to provide improved digital circuitry.

It is another object of the present invention to provide an improved queue within a digital circuit.

It is yet another object of the present invention to provide an improved queue having distributed multiplexing logic.

The foregoing objects are achieved as is now described. A queue includes a data multiplexer having an output and at least two inputs and a plurality of data latches. The data latches include at least a first data latch and a second data latch, which each have a data input and a data output. The data output of the first data latch is coupled to a first input of the data multiplexer, and the output of the data multiplexer is coupled to the data input of the second data latch. A data value to be stored in the queue is received at a second input to the data multiplexer. In response to one or more control signals, the data value is latched into at least one of the first and second data latches, thereby storing the data value in the queue. Depending upon the design of the control logic, the queue can implement either first in, first out (FIFO) or last in, first out (LIFO) behavior.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
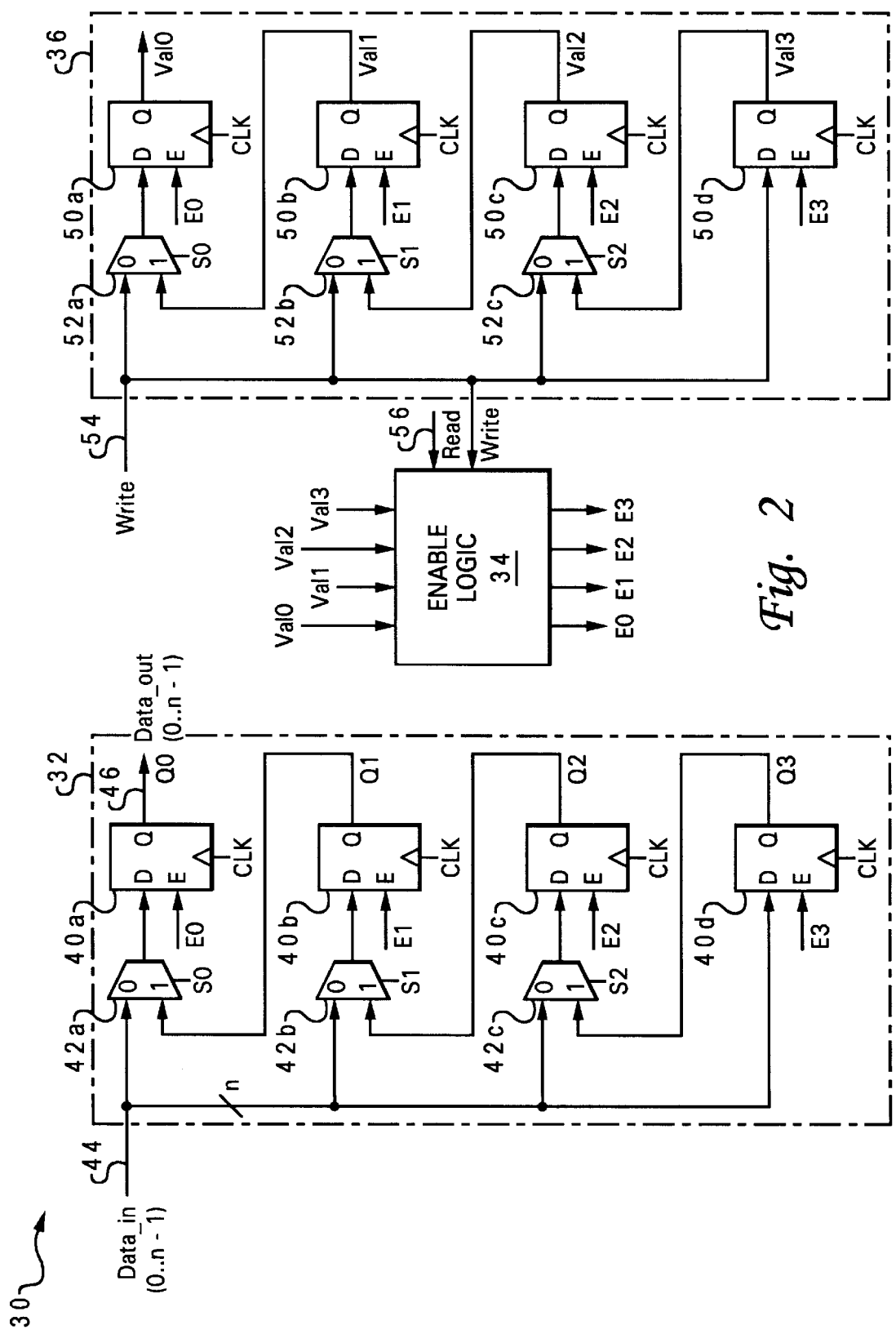
FIG. 2 depicts an illustrative embodiment of a FIFO queue in accordance with the present invention.

With reference again to the figures and in particular with reference to FIG. 2, there is depicted an illustrative embodiment of a first in, first out (FIFO) queue in accordance with the present invention. As illustrated, FIFO queue 30 includes data storage 32, enable logic 34, and validity logic 36. Data storage 32 includes K, in this case four, data latches 40, which in the depicted embodiment are implemented with D-latches. Each data latch 40, which forms an n-bit entry in FIFO queue 30, has a data input (D), an enable input (E), a clock input that receives a clock signal (CLK), and a data output (Q). Data storage 32 further includes K-1 (e.g., three) data multiplexers 42, which each have two data inputs, a select input, and a data output.

As illustrated, an n-bit Data_in signal 44, which supplies n-bit data values to be stored in FIFO queue 30, is coupled to a first data input of each of multiplexers 42 and to the data input of data latch 40d. The second data input of each of data multiplexers 42 is connected to the data output of the adjacent queue entry's data latch 40, and the output of each of multiplexers 42 is connected to the data input of a respective one of data latches 40. Each of multiplexers 42 selects one of its data input values as an output value in response to the value present at its select input. Latching of data values into and out of data latches 40 is enabled by enable signals E0, E1, E2 and E3, which are generated by enable logic 34, as described below. Data values latched out of data latch 40a, which always stores the oldest entry in FIFO queue 30, form an n-bit Data_out signal 46.

As becomes apparent upon inspection of FIG. 2, validity logic 36 is constructed similarly to data storage 32. Validity logic 36 includes K single-bit control latches 50 and K-1 2-to-1 control multiplexers 52, which are interconnected in the manner described above with respect to data latches 40 and data multiplexers 42. The operation of control multiplexers 52 and control latches 50 are controlled by the same select signals (S0, S1 and S2) and enable signals (E0, E1, E2, and E3) utilized to control the corresponding data multiplexers 42 and data latches 40 within data storage 32. Validity logic 36 receives Write control signal 54 as an input and produces four validity signals (Val0, Val1, Val2 and Val3) as outputs. The validity signals generated by validity logic 36, which each form an input of enable logic 34, indicate whether the corresponding data latch 40 holds a valid data value. That is, Val0 indicates if data latch 40a contains valid data; Val1 indicates if data latch 40b contains valid data, etc. Thus, if Val0 is deasserted, FIFO queue 30 is empty, and if Val3 is asserted, FIFO queue 30 is full. The validity signals also provide select signals for data multiplexers 42 and control multiplexers 52 as follows:

S0=Val1,

S1=Val2,

S2=Val3, which can be generalized as

S[i]=Val[i+1].

As depicted in FIG. 2, enable logic 34 utilizes the validity signals generated by validity logic 36, Write control signal 54, and a Read control signal 56 to generate enable signals E0, E1, E2 and E3, which enable latching by data latches 40 and control latches 50. In a preferred embodiment, enable logic 34 implements the following equations:

$E0=(Read*Val0)+(Write*/Val0),$ $E1=(Read*Val1)+(/Read*Write*/Val1*Val0),$ $E2=(Read*Val2)+(/Read*Write*/Val2*Val1),$ $E3=(Read*Val3)+(/Read*Write*/Val3*Val2),$ which for enable signals other than E0 can be generalized as:

$E[i]=(Read*Val[i])+(/Read*Write*/Val[i]*Val[i-1]).$

Figure 1:
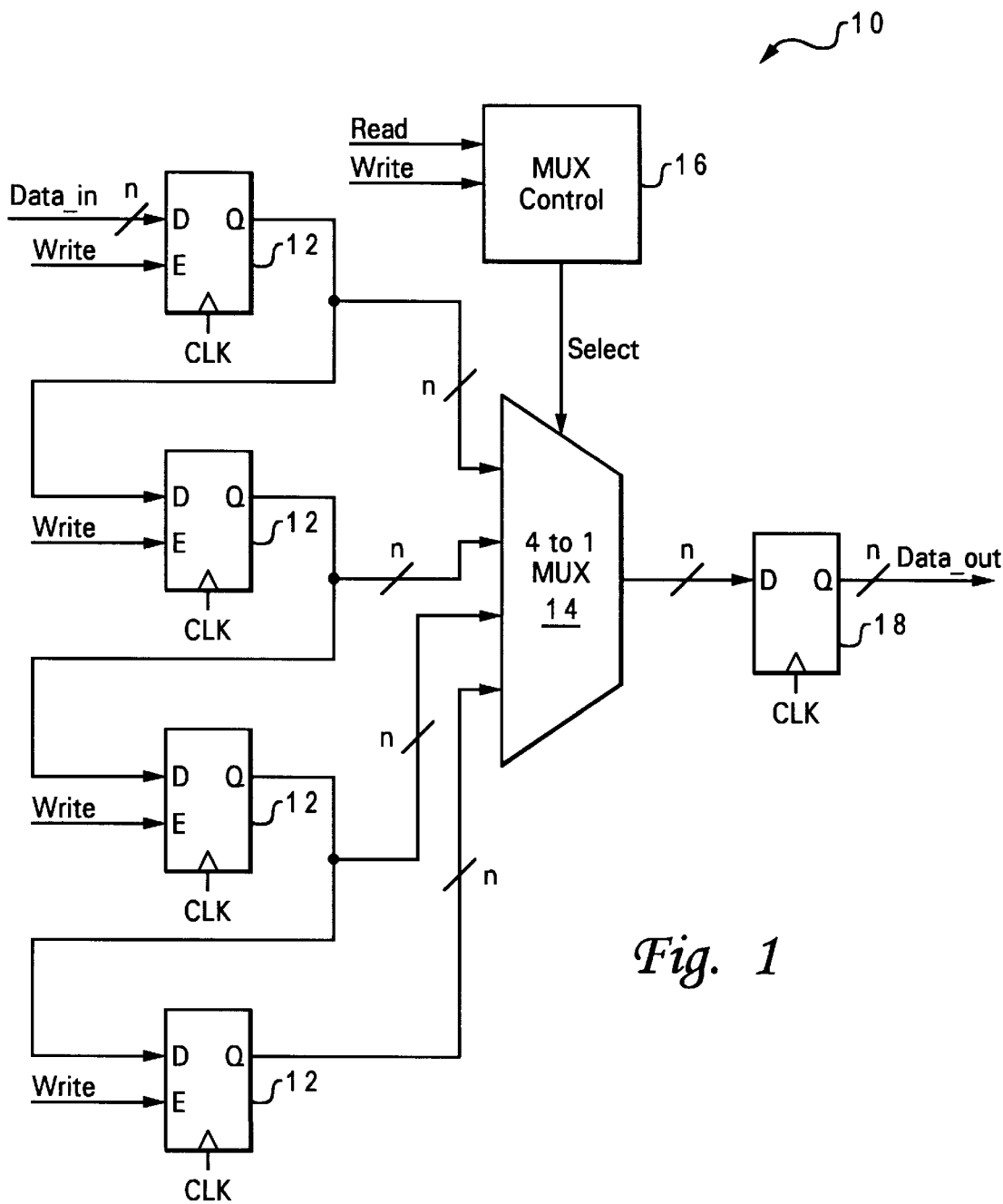
FIG. 1 illustrates a conventional FIFO queue.

These enable equations indicate that in response to the assertion of Read control signal 56, the data value held by data latch 40a is latched out as Data_out signal 46 if Val0 indicates that data latch 40a stores a valid data value. Enable signals E0, E1, E2 and E3 and validity signals Val1, Val2 and Val3 cause other valid data values, if any, to be latched out of data latches 40b, 40c and 40d and latched into data latches 40a, 40b and 40c, respectively. Importantly, the elimination of a separate output latch (as utilized in FIFO queue 10 of FIG. 1) permits FIFO queue 30 to provide Data_out signal 46 during the same cycle in which Read control signal 56 is asserted while maintaining a latch bound, asynchronous interface suitable for use in high performance FPGAs.

In response to the assertion of Write control signal 54 when Read control signal 44 is deasserted, the enable equations listed above prescribe that the data value provided by Data_in signal 44 is latched by data latch 40a if FIFO queue 30 is empty and is otherwise latched into the first data latch 40 that does not hold a valid data value (i.e., data latch 40b; and failing that, data latch 40c; and failing that, data latch 40d). In the event that all of data latches 40a–40d hold valid data values, an error condition occurs, and the Write operation fails. Of course, by changing the above enable equations appropriately, a Write to a full queue when Read control signal 56 is deasserted could alternatively be handled by latching the Data_in value into data latch 40d, latching out the oldest data value from data latch 40a, and shifting the remainder of the valid data values. That is, in fact, how FIFO queue 30 handles the concurrent assertion of Read control signal 56 and Write control signal 54 when FIFO queue 30 is full according to the enable equations listed above. In this regard, it is important to note that enable signals E1, E2, and E3 generated in response to the concurrent assertion of control signals 54 and 56 are the same as those generated in cases in which only Read control signal 56 is asserted. In this manner, FIFO queue 30 permits data values to be both stored to and read from data storage 32 during a single cycle of the clock signal.

Figure 3:
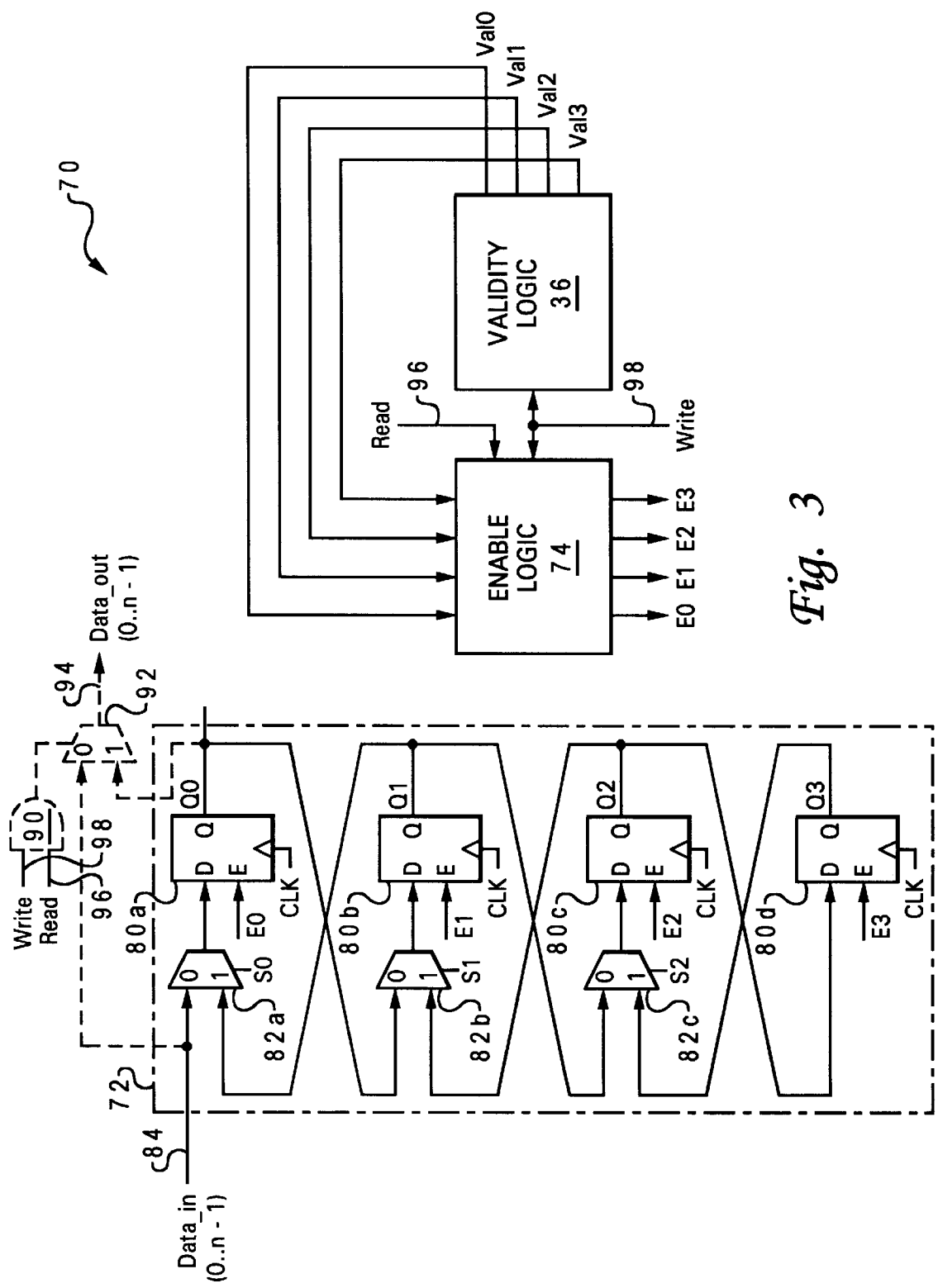
FIG. 3 illustrates an exemplary embodiment of a last in, first out (LIFO) queue in accordance with the present invention.

In alternative embodiments of the present invention, the basic queue structure shown in FIG. 2 can also be utilized to implement other queue behaviors such as last in, first out (LIFO). For example, FIG. 3 illustrates a LIFO queue in accordance with the present invention. Like FIFO queue 30 of FIG. 2, LIFO queue 70 includes data storage 72, enable logic 74, and validity logic 36. Data storage 72 includes K, in this case four, data latches 80, which in the depicted embodiment are implemented with D-latches. As discussed above, each data latch 80, which forms an n-bit entry in LIFO queue 70, has a data input (D), an enable input (E), a clock input that receives a clock signal (CLK), and a data output (Q). Data storage 72 further includes K-1 (e.g., three) data multiplexers 82, which each have two data inputs, a select input, and a data output.

As illustrated, an n-bit Data_in signal 84, which supplies n-bit data values to be stored in LIFO queue 70, is coupled to a first data input of multiplexer 82a, and the second data input of data multiplexers 82a is connected to the data output of the adjacent queue entry's data latch 80b. The output of multiplexer 82a is connected to the data input of its respective data latch 80a, which always stores the top (i.e., newest or last-in) entry of LIFO queue 70. As shown, the first data input of each of multiplexers 82b and 82c is coupled to the data output of the data latch 80 forming the preceding entry in LIFO queue 72, and the second data input of each of multiplexers 82b and 82c is coupled to the data output of the data latch 80 forming the subsequent entry in LIFO queue 72. As with multiplexer 82a, the outputs of multiplexers 82b and 82c are connected to the data inputs of a corresponding one of data latches 80b and 80c. The data input of data latch 80d is simply connected to the data output of data latch 80c. The described interconnection of multiplexers 82 and data latches 80 permit data values to be shifted toward the bottom of LIFO queue 70 as new data values are written into LIFO queue 70 and to be shifted toward the top of LIFO queue 70 as data values are read from LIFO queue 70. Shifting of data values between data latches 80 is controlled by select signals S0, S1, and S2 and enable signals E0, E1, E2 and E3.

If LIFO queue 70 is constrained such that data storage 72 cannot be both read and written during the same cycle, data output Q0 of data latch 80a forms an n-bit Data_out signal. However, in an alternative embodiment of the present invention that supports both reading and writing during the same cycle, LIFO queue 70 further includes a bypass multiplexer 92 that selects either Data_in signal 84 or data output Q0 as Data_out signal 94 in response to a select signal output by NAND gate 90. Thus, if both Read control signal 96 and Write control signal 98 are asserted concurrently, Data_in signal 84 is selected as Data_out signal 94. Otherwise, data output Q0 is selected as Data_out signal 94.

As indicated by like reference numerals, validity logic 36 of LIFO queue 70 has the same structure and function as discussed above with respect to FIG. 2. The validity signals Val0, Val1, Val2, and Val3 generated by validity logic form inputs of enable logic 74 and are utilized to obtain multiplexer select signals. In an embodiment of LIFO queue 70 that supports concurrent reads and writes, the select signals are obtained as follows:

S0=Read*/Write*Val1,
S1=Read*/Write*Val2,
S2=Read*/Write*Val3, which may be generalized as:

$S[i]$=Read*/Write*$Val[i+1]$.

Enable logic 74 utilizes Read control signal 96, Write control signal 98, and the validity signals produced by validity logic 36 to produce enable signals E0, E1, E2, and E3. In a preferred embodiment in which concurrent reads and writes are supported, the following enable equations apply:

$E0$=(Read*/Write*$Val0$)+(/Read*Write), $E1$=(Read*/Write*$Val1$)+(/Read*Write*$Val0$), $E2$=(Read*/Write*$Val2$)+(/Read*Write*$Val1$), $E3$=(Read*/Write*$Val3$)+(/Read*Write*$Val2$), which for enable signals other than E0 can be generalized as:

$E[i]$=(Read*/Write*$Val[i]$)+(/Read*Write*$Val[i-1]$).

As noted above, the LIFO select and enable equations prescribe that data values are shifted down in LIFO queue 70 (i.e., toward data latch 80d) as new data values are written into data storage 72 and are shifted toward the top of LIFO queue 70 as data values are read from data storage 72. Both writes to a full queue (Val3=1) and reads from an empty queue (Val0=0) are error conditions that can be handled by conventional error handling logic outside of LIFO queue 70.

As has been described, the present invention provides an improved queue design having distributed multiplexing logic. The interconnection of input multiplexers and data latches in the manner described above can provide performance and size benefits over conventional queue designs, particularly in FPGA embodiments. For example, in a typical FPGA architecture such as the Altera 10k100family, each logic cell (LCELL) includes a 4-input lookup table and a latch. In conventional FIFO queue 10 of FIG. 1, each entry latch 12 would require a separate LCELL, and N-to-1 multiplexer 14 would require a number of additional LCELLs. In contrast, in the queue embodiments shown in FIGS. 2 and 3, a single LCELL can be utilized to implement both a 2-input multiplexer and its associated latch (e.g., data multiplexer 42 and data latch 40). As a result, the number of LCELLs utilized to implement a queue and thus the overall physical queue dimensions can be significantly reduced. In addition, the placement of an interconnected multiplexer-latch pair within a single LCELL has the benefit of decreasing interconnect lengths and concomitantly reducing signal routing latency. Furthermore, because the queue design of the present invention does not utilize a single, relatively slow, central multiplexer, the queue design of the present invention easily scales for use with deep queues (e.g., queues having more than 8 entries) and high operating frequencies. For example, the operating frequency of an 18-bit, 4-entry FIFO queue realized in an FPGA in accordance with the present invention can be increased approximately 30% over the conventional queue design illustrated in FIG. 1.

While the invention has been particularly shown and described with reference to a preferred embodiment, it will be understood by those skilled in the art that various changes in form and detail may be made therein without departing from the spirit and scope of the invention. For example, although the present invention has been described with respect to particular FIFO and LIFO embodiments, it should be understood that other queue behaviors and variations of the described FIFO and LIFO behaviors can be implemented utilizing the basic queue design disclosed herein. In addition, although numerous benefits of the application of the present invention to FPGAs have been discussed, it should be understood that the present invention is not limited to FPGA embodiments, but is intended to encompass queues implemented utilizing other technologies, including without limitation ASICs (Application Specific Integrated Circuits).

What is claimed is:

1. A queue, comprising:

a data multiplexer having an output and at least two inputs;

a plurality of data latches including at least a first data latch and a second data latch, each of said plurality of data latches having a data input and a data output, wherein a data value to be stored in said queue is coupled to a first input of said data multiplexer, said data output of said second data latch is coupled to a second input of said data multiplexer, and said output of said data multiplexer is coupled to said data input of said first data latch; and control logic, coupled to said plurality of data latches, that controls latching in and latching out of data values by said plurality of data latches, said control logic including:

a control multiplexer having an output and at least two inputs; and a plurality of control latches including at least a first control latch and a second control latch, each of said plurality of control latches having an input and an output, wherein said output of said second control latch is coupled to a first input of said control multiplexer and said output of said control multiplexer is coupled to said input of said first control latch, and wherein values at said outputs of said first and second control latches are utilized to obtain enable signals that enable latching of data by said plurality of data latches.

2. The queue of claim 1, wherein:

said plurality of data latches includes K data latches that each form an entry in said queue;

said data multiplexer is a first data multiplexer; and said queue includes K-1 data multiplexers including said first data multiplexer, wherein said K-1 data multiplexers each have an output coupled to a data input of a respective one of said K data latches.

3. The queue of claim 1, wherein said outputs of said plurality of control latches are utilized to obtain a select signal for said data multiplexer.

4. The queue of claim 1, and further comprising a Write control signal coupled to said input of said second control latch and a first input of said control multiplexer.

5. The queue of claim 1, wherein said plurality of data latches are D-latches.

6. The queue of claim 1, wherein said queue is a first in, first out (FIFO) queue.

7. The queue of claim 6, wherein:

said data input of said second data latch receives a data value to be stored in said queue; and said data output of said first data latch forms a data output of said queue.

8. The queue of claim 1, wherein said queue is a last in, first out (LIFO) queue.

9. The queue of claim 8, wherein said data input of said second data latch is coupled to receive data values output by said first data latch.

10. The queue of claim 1, and further comprising enable logic, coupled to said data latches and the outputs of the control latches, that produces enable signals that enable latching of data by said plurality of data latches.

11. A method for operating a queue including a data multiplexer and a plurality of data latches including at least first and second data latches, wherein a data-in signal conveying data values to be stored in said queue is coupled to a first input of said data multiplexer, a data output of said second data latch is coupled to a second input of said data multiplexer, and an output of said data multiplexer is coupled to a data input of said first data latch, said method comprising:

receiving a data value to be stored in said queue at said multiplexer;

storing said data value in said queue by latching said data value into said first data latch in response to one or more control signals; and generating at least one of said control signals utilizing first and second control latches and a control multiplexer, wherein an output of said second control latch is coupled to a first input of said control multiplexer and an output of said control multiplexer is coupled to an input of said first control latch.

12. The method of claim 11, wherein receiving said data value comprises:

concurrently receiving said data value at both said multiplexer and at a data input of one of said plurality of data latches.

13. The method of claim 11, and further comprising:

latching a data value out of said first data latch as a data output of said queue in response to a Read control signal.

14. The method of claim 13, and further comprising:

latching a data value out of said second data latch and into said first data latch in response to said Read control signal.

15. The method of claim 13, wherein said queue is a first in, first out (FIFO) queue, and wherein latching a data value out of said first data latch comprises latching an oldest data value out of said first data latch as a data output of said FIFO queue.

16. The method of claim 13, wherein said queue is a last in, first out (LIFO) queue, and wherein latching a data value out of said first data latch comprises latching a newest data value out of said first data latch as a data output of said LIFO queue.

17. The method of claim 16, and further comprising:

selecting a data value present at one of said first and second inputs of said data multiplexer as an data input of said first data latch in response to an output of one of said first and second control latches.

18. The method of claim 16, and further comprising:

providing a Write control signal to an input of said second control latch and a second input of said control multiplexer.

19. A queue, comprising:

a data multiplexer having an output and at least two inputs;

a plurality of data latches including at least a first data latch and a second data latch, each of said plurality of data latches having a data input and a data output, wherein a data value to be stored in said queue is coupled to a first input of said data multiplexer, said data output of said second data latch is coupled to a second input of said data multiplexer, and said output of said data multiplexer is coupled to said data input of said first data latch; and control logic, coupled to said plurality of data latches, that controls latching in and latching out of data values by said plurality of data latches, said control logic including a control multiplexer and a plurality of control latches having interconnections corresponding to those between said data multiplexer and said plurality of data latches.

20. The queue of claim 19, wherein the control multiplexer has at least a first input and an output and the plurality of control latches includes a first control latch and a second control latch each having an input and an output, wherein the output of the second control latch is coupled to the first input of the control multiplexer and the output of the control multiplexer is coupled to the input of the first control latch.

21. The queue of claim 19, and further comprising enable logic, coupled to said data latches and the outputs of the control latches, that produces enable signals that enable latching of data by said plurality of data latches.

* * * * *